United States Patent [19]
Fritz

[11] Patent Number: 5,838,490
[45] Date of Patent: Nov. 17, 1998

[54] HEAD MOUNTED DISPLAY SYSTEM USING MANGIN MIRROR COMBINER

[75] Inventor: Bernard S. Fritz, Eagan, Minn.

[73] Assignee: Honeywell Inc., Minneapolis, Minn.

[21] Appl. No.: 740,741

[22] Filed: Nov. 4, 1996

[51] Int. Cl.$^6$ .................................................. G02B 27/14
[52] U.S. Cl. ........................................ 359/631; 359/630
[58] Field of Search ...................... 359/630, 631, 359/633, 619, 625, 627, 629, 634, 636, 638, 726, 727, 730, 731, 831, 833, 834

[56] References Cited

U.S. PATENT DOCUMENTS

| | | | |
|---|---|---|---|
| 4,859,030 | 8/1989 | Rotier | 350/174 |
| 5,241,423 | 8/1993 | Chiu et al. | 359/727 |
| 5,303,085 | 4/1994 | Rallison | 359/631 |
| 5,459,612 | 10/1995 | Ingleton | 359/630 |
| 5,483,307 | 1/1996 | Anderson | 359/630 |
| 5,537,253 | 7/1996 | Cox et al. | 359/630 |
| 5,539,578 | 7/1996 | Togino et al. | 359/630 |
| 5,546,227 | 8/1996 | Yasugaki et al. | 359/630 |

OTHER PUBLICATIONS

Book entitled "Lens Design Fundamentals" by Rudolf Kingslake, pp. 309–311, published by Academic Press, New York, San Francisco, London 1978.

*Primary Examiner*—Frank G. Font
*Assistant Examiner*—Michael P. Stafira
*Attorney, Agent, or Firm*—Albert K. Kau

[57] ABSTRACT

A head mounted display which utilizes a flat image source, an optical system including a reflecting filter and a Mangin mirror having at least one curved surface, operable to make the flat image compatible with the flat image source, and provide an undistorted image to be viewed by the eye of a viewer.

13 Claims, 1 Drawing Sheet

HEAD MOUNTED DISPLAY SYSTEM USING MANGIN MIRROR COMBINER

The Government has rights in this invention pursuant to Contract No. DAAK 60-92-C-0065, awarded by the Department of Army.

BACKGROUND OF INVENTION

1. Field of the Invention

The present invention relates to head mounted displays and more particularly to a head mounted display having a simplified optical system which uses a Mangin mirror combiner that allows undistorted see-through abilities with aberration control.

2. Description of the Prior Art

Head mounted displays are common in the art. A particularly useful design may be found in the Donald Rotier U.S. Pat. No. 4,859,030 issued Aug. 22, 1989 and assigned to the assignee of the present invention. The display arrangement of the Rotier patent uses an optical system mounted to the helmet of an aircraft pilot and consists of a CRT as an image source and an optical transmitter consisting of a plurality of various lenses to convey the image from the CRT to a filter member from which the image is reflected to a curved surface and re-reflected back through the filter member to the eye of the observer. Head mounted displays of this sort have found wide use in aircraft applications.

One difficulty encountered in such systems is the complexity, size and weight of the optical arrangement. Many attempts to simplify the system have been undertaken to reduce the complexity but a number of difficulties have been encountered. A major difficulty is that the optical system inherently causes distortion of the image passing through it which accounts for some of the refractive elements of the transmission system such as that of Rotier. A U.S. Pat. No. 5,303,085 shows a system which eliminates most of the complex set of lenses, but requires the use of an off center fiber optic arrangement to produce a curved display surface compatible with the optical system. While a liquid crystal display is shown in this patent, which is a desirable feature, the use of fiber optics badly reduces the resolution of the image.

BRIEF DESCRIPTION OF THE INVENTION

The present invention uses a form of a Mangin mirror as a combiner which can operate with a flat surface display. A mating element is used with the Mangin mirror to provide "see-through" capability to the outside world as required aircraft use but which may not be required for other uses such as video games. This image combiner permits use of either an electroluminiscent, a liquid crystal image source or any flat panel display in a simple low complexity, low weight and superior imaging arrangement.

DETAILED DESCRIPTION OF THE PREFERRED EMBODIMENTS

Figure 1:
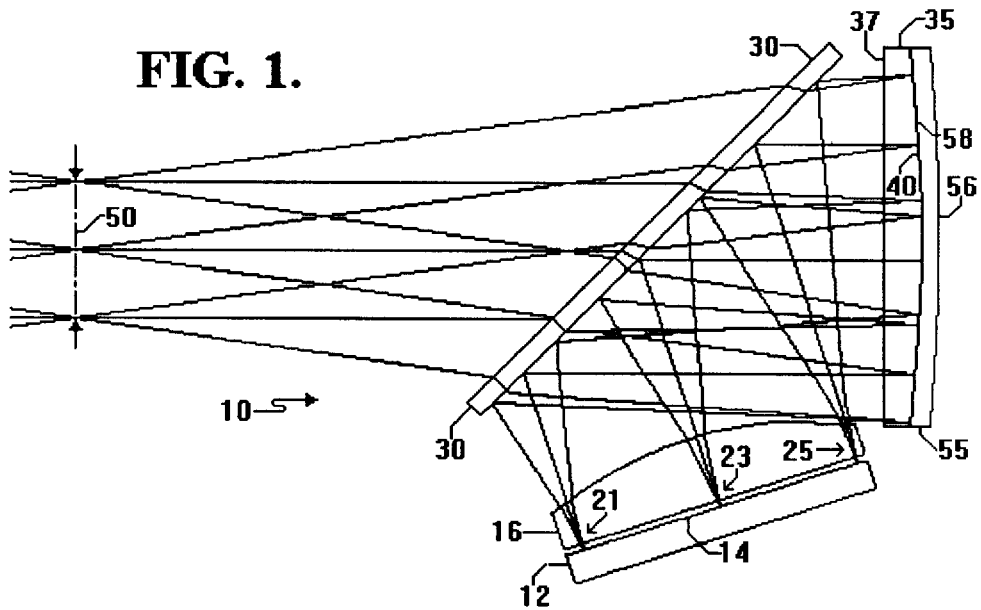
FIG. 1 is a first embodiment of the present invention.
Figure 2:
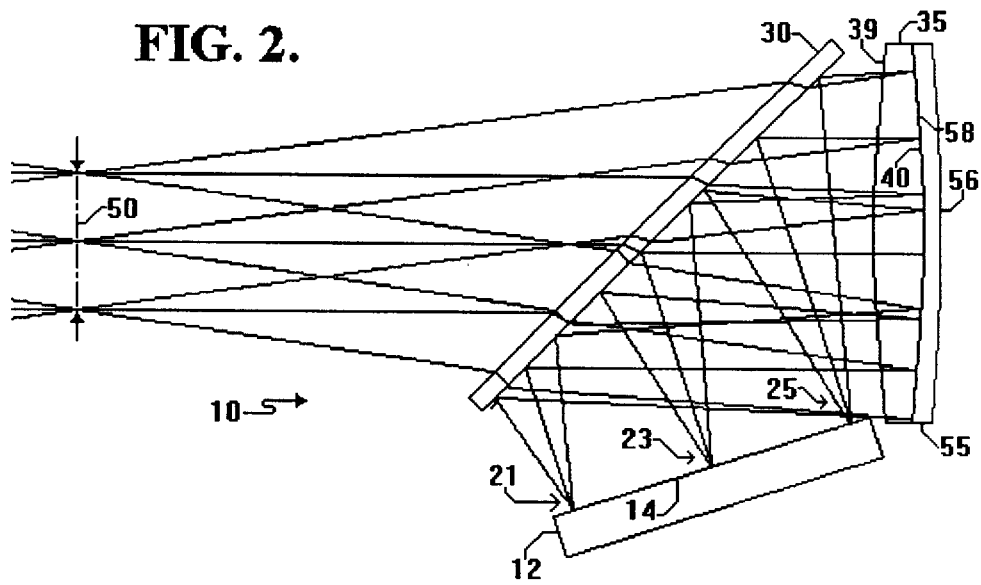
FIG. 2 is a second embodiment of the present invention.

Referring to FIGS. 1 and 2, an optical system 10 is shown having a source of image 12 which is a "flat surface display", such as an electroluminiscent or a liquid crystal display. The flat surface 14 of source 12 may have a lens element 16 adjacent thereto, as shown in FIG. 1 or not as shown in FIG. 2. When used, lens 16 is a low power lens to improve image quality but is normally not always necessary. In either event, the image from the surface 14 is directed, as shown by ray trace groups 21, 23 and 25 to a partly reflecting filter 30 which may be like that of the above mentioned Rotier patent. The light reflected from filter 30 is received by a Mangin mirror 35 which may have a substantially flat front surface 37, as shown in FIG. 1 or may have a curved front surface 39 as shown in FIG. 2 and in either case has a curved rear surface 40. The use of a curved front surface 39 will be desirable to make the image being reflected more compatible with the flat panel display.

A Mangin mirror is one having a reflecting surface on the rear side of the material from the entrance of the light rays. Mangin mirrors similar to mirror 35 are described on pages 309–311 of a book entitled "Lens Design Fundamentals" by Rudolf Kingslake and published by Academic Press, New York, San Francisco, London 1978. In the figures, the rays reflected from filter 30 pass through the body of the Mangin mirror 35 and are shown being reflected from the rear side 40 thereof. These rays are directed back through the mirror 35 and are refracted by surface 37 or 39 to the filter 30. The rays, which are collimated, pass through filter 30, and are directed to an exit pupil plane 50 where the eye of a viewer may be placed to view the image. The use of the Mangin mirror 35 provides an additional refractive element to modify the image to be compatible with the flat panel display represented by source 12.

In order for the pilot or other viewer to not only receive the image from the source 12 but also view the outside world undistorted, a transparent mating member 55, having a curved back surface 56 and a curved front surface 58 configured to conform to the curved surface 40 is shown in the figures attached to the Mangin mirror 35. Back surface 56 is curved to provide zero power for the light coming from the remote scene and passing through members 35 and 55 so that it may be viewed without distortion. Surface 40, in this case, is made partially reflective to allow radiation from the remote scene to pass therethrough. With member 55, the viewer is enabled to see the image from source 12 superimposed on the remote image from the outside world which passes through mating member 55 and travels with the reflected light from source 12 to the viewer's eye position 50.

As mentioned, the optical system inherently causes the image to distort which has heretofore required a curved image source or a complex optical system to produce the desired image shape compatible with the optical system. My discovery that a Mangin mirror can be used to supply an additional refractive surface to produce the same effect allows the prior art systems to be vastly simplified. A Mangin mirror is, however, likely to introduce chromatic aberration which, if desired, may be removed by making one of the other surfaces, such as surface 37 or 39 diffractive, to correct for any such chromatic aberration. When transparent member 55 is used, surface 56 may be made diffractive to correct for chromatic aberration in the radiation from the remote scene.

The result of the present invention is a light weight system which can be mounted to the head and produce a bright clear undistorted image superimposed on a scene being viewed. Many changes and alterations will occur to those having skill in the art. For example, the various materials can be made of plastic to increase the lightness, higher intensity light sources may be employed to supply brighter images and lenses which do not interfere with the viewing may be added to improve image clarity. Accordingly, I do not wish to be limited to the specific elements used to describe the preferred embodiments.

The embodiments of the invention in which an exclusive property or right is claimed are defined as follows:

1. A head mounted display system for transmitting an image from a flat image source through an optical system to the eye of a viewer, comprising:

a partly reflective first member to receive and reflect light from the source;

a Mangin mirror having a curved reflecting surface to receive the light reflected from the first member and reflect it back through the first member to the eye and a transparent element mated to the curved surface of the Mangin mirror to pass light from a remote scene through the mirror and the first member so as to be combined with the image as viewed by the eye.

2. The display of claim 1 wherein the Mangin mirror has a curved second surface opposite the curved reflecting surface.

3. The display of claim 1 further including a lens adjacent the flat image source.

4. The display of claim 1 wherein the optical system includes a plurality of surfaces and wherein the Mangin mirror introduces chromatic aberration and at least one of the surfaces is made diffractive to correct the chromatic aberration.

5. The display of claim 1 wherein the optical system includes plurality of surfaces and wherein the Mangin mirror introduces chromatic aberration and two of the surfaces is made diffractive to correct the chromatic aberration.

6. The display of claim 1 wherein the flat image source is an electroluminiscent display.

7. The display of claim 1 wherein the flat image source is a liquid crystal display.

8. An optical system for use in a head mounted display comprising:

a flat source of image;

a partly reflective filter positioned to receive and reflect radiation from the source;

a Mangin mirror having a curved reflecting surface positioned to receive radiation from the filter and reflect back through the partly reflective filter to an exit pupil where the image from the source may be viewed and a transparent element mated to the curved surface of the Mangin mirror to pass light from a remote scene through the mirror and the filter so as to be combined with the image as viewed by the eye.

9. The optical system of claim 8 wherein the transparent mating member is adjacent to the curved reflecting surface and configured to provide zero power so that radiation from a remote scene will pass through the transparent member, the Mangin mirror, the filter to the exit pupil where the image from the source and the remote scene may be viewed without distortion.

10. The optical system of claim 8 further including at least one diffractive surface through which the radiation passes to the exit pupil to correct for any chromatic aberration.

11. The optical system of claim 9 wherein the optical system includes plurality of surfaces and wherein the Mangin mirror introduces chromatic aberration and at least two of the surfaces is made diffractive to correct the chromatic aberration.

12. The optical system of claim 8 further including a lens positioned between the flat source and the partly reflecting filter.

13. The optical system of claim 9 further including a lens positioned between the flat source and the partly reflecting filter.

* * * * *